May 11, 1965  K. L. SPENCER  3,182,951
PIVOTED VALVE
Filed Jan. 18, 1962  2 Sheets-Sheet 1
Fig. 1.
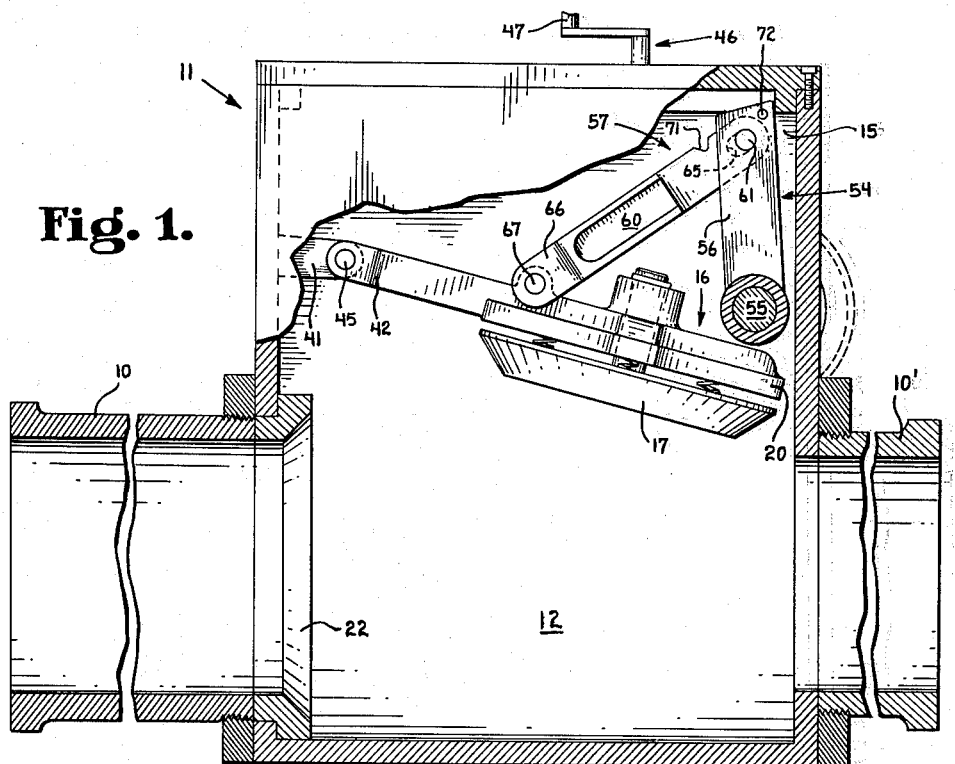
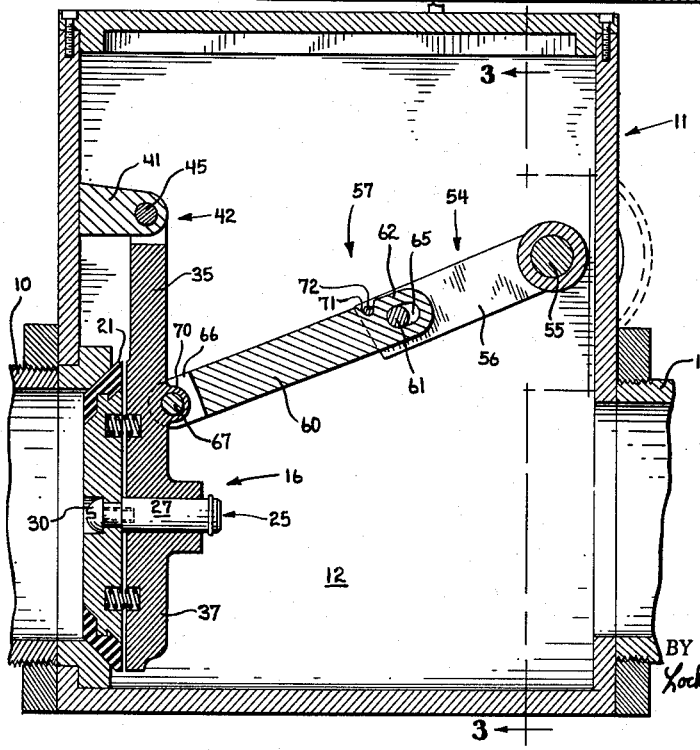
Fig. 2.
INVENTOR.
KENNETH L. SPENCER
BY
Lockwood, Woodard, Smith & Weikart
Attorneys May 11, 1965

K. L. SPENCER 3,182,951

PIVOTED VALVE

Filed Jan. 18, 1962

INVENTOR.
KENNETH L. SPENCER
BY
Lockwood, Woodard, Smith & Weikart
Attorneys

# United States Patent Office 3,182,951
Patented May 11, 1965

3,182,951
PIVOTED VALVE
Kenneth L. Spencer, 2403 N. LaSalle St.,
Indianapolis, Ind.
Filed Jan. 18, 1962, Ser. No. 166,991
1 Claim. (Cl. 251—85)

The present invention relates to a valve arrangement and particularly to a valve arrangement for use in liquid elimination system such as conduits connecting the waste system of a house and a city sewer. This application is a continuation-in-part of Serial No. 87,805, filed Feb. 8, 1961, now abandoned.

In certain areas of the country, sewers will frequently back up as a result of flash rains and for other reasons, causing sewage to back up, for example, into the basement of the house or the like. Frequently, such a condition occurs in the situation where the house or other building is located on low ground. It is, therefore, desirable that a highly efficient valve arrangement be provided for cutting off reverse flow from the city sewer in to the plumbing system of the house or into the basement thereof. Consequently, one object of the present invention is to provide an improved valve arrangement for use in such elimination systems.

A further object of the present invention is to provide a valve arrangement for an elimination system, said valve arrangement being highly adapted for easy cleaning of the valve arrangement and the conduit adjacent thereto by conventional sewer cleaning apparatus such as that known by the trademark Roto-Rooter.

A further object of the present invention is to provide a valve which is capable of closing over objects such as sticks and stones which are found in sewer systems.

A further object of the present invention is to provide a valve construction in such a manner as to prevent sticks and other objects from interfering with the operation of the valve.

Related objects and advantages will become apparent as the description proceeds.

One embodiment of the present invention includes a valve arrangement comprising a pair of conduits having registering end portions, a valve housing connecting said end portions, one of said conduits defining a valve seat at its opening into said valve housing, said housing having a hollow interior a portion of which is above and out of registry with said conduits, a valve element pivotally mounted about a horizontal axis upon said housing for swinging said valve element into a first position in said portion, said valve element being swingable downwardly to a second position wherein said valve element is seated in said valve seat, and means for moving said valve element between said positions.

The full nature of the invention will be understood from the accompanying drawings and the following description and claim.

FIG. 1 is a cross sectional view of a valve arrangement constructed according to the present invention and showing the valve arrangement in open position.

FIG. 2 is a view similar to FIG. 1 showing the valve arrangement in closed position.

Figure 4:
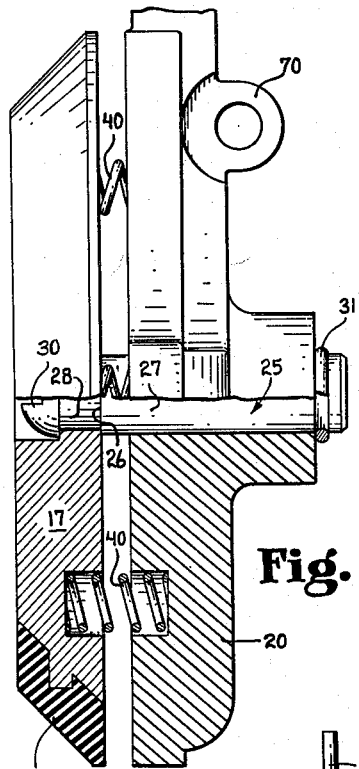
FIG. 4 is an enlarged partially cut-away side view of a valve head forming part of the structure.
Figure 3:
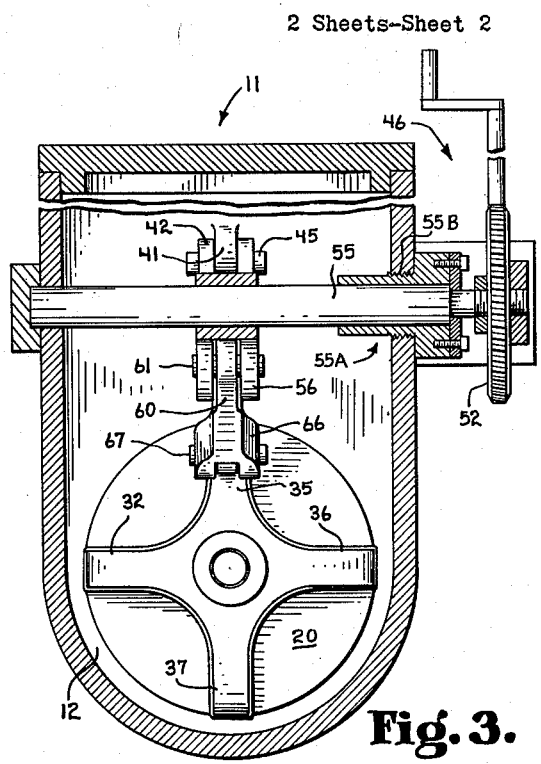
FIG. 3 is a cross section taken along the lines 3—3 of FIG. 2.
Figure 6:
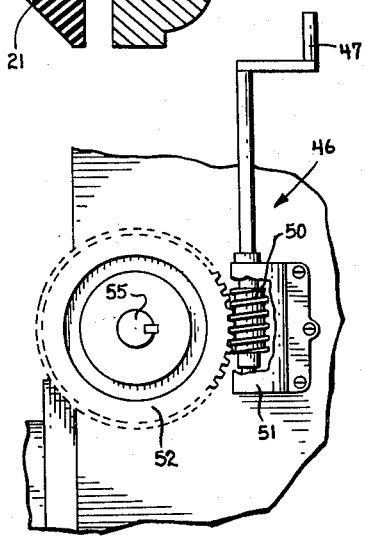
FIG. 6 is a fragmentary side elevation of the valve housing forming a part of the structure.
Figure 5:
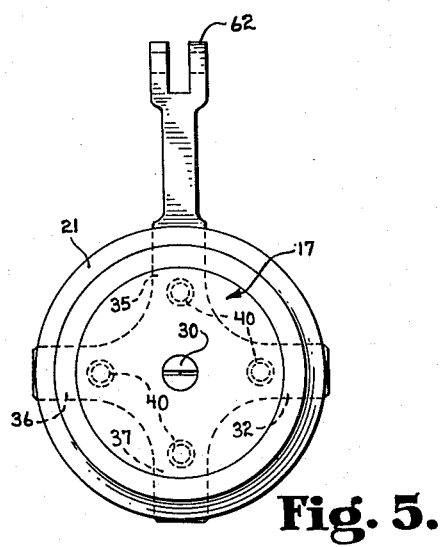
FIG. 5 is a front view of the valve head and associated structure, said view being taken along the line 5—5 of FIG. 1.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a valve arrangement which includes a pair of conduits 10 and 10' each of which are straight and cylindrical and each of which are in registry and coaxial with one another. These conduits might, for example, form a part of the drainage system between a house and the city sewer. A valve housing 11 is fixed to the conduits 10 and 10' and has a hollow interior 12 which provides closed communication between the conduits. The interior 12 of the valve housing has a portion 15 which is above and out of registry with the conduits 10 and 10'.

Inside of the valve housing is received a valve element 16 which includes a frustoconically shaped valve head 17 and a spider 20 reciprocally mounting said valve head. At the outer periphery of the valve head, there is mounted a molded neoprene seal 21, which when the valve is in closed position engages a valve seat 22 formed at the opening of the conduit 10 into the housing 11. This neoprene seal is provided to insure that steel shavings and other hard sharp objects will not cut into the valve head or seal so as to interfere with the operation of the valve. Even though the seal 21 is extremely tough and resistent to cutting, it is also resilient and can deform so that the valve can close even though objects are between the seal and the valve seat.

The reciprocal mounting of the valve head upon the spider 20 is accomplished by means of a shaft 25 having a shoulder 26 joining the larger diameter portion 27 to the reduced diameter portion 28. A screw 30 is threadedly fixed within the end of the shaft 25 and secures the valve head 17 to the shaft. A snap ring 31 is received in a suitable annular indentation in the outer periphery of the enlarged portion 27 of the shaft and provides a limiting surface preventing relative movement apart of the valve head and spider beyond the illustrated position of FIG. 4. The spider includes four arms 32, 35, 36 and 37 each of which extend radially with adjacent arms at 90 degrees to one another. Received between the arms of the spider and the valve head is a plurality of compression springs 40 which are received within suitable depressions in the valve head and arms. Each of the arms is provided with one of the springs 40. It will be noted that the uppermost spring 40 is positioned above the two springs 40 which are most adjacent thereto (those springs associated with the arms 36 and 32). It will further be noted that none of the adjacent ones of the springs 40 are on the same horizontal level. For these reasons, a stick which might drop downwardly from above the valve head in between the spider and valve head will not be supported in a horizontal manner by the springs 40 and instead will drop away from the valve head and spider, thus reducing the possibility of sticks and other such elongated objects becoming lodged between the valve head and spider.

The arm 35 of the spider is substantially longer than the other arms thereof and is pivotally mounted upon a projection 41 on the inner surface of the valve housing 11, this mounting being accomplished by a yoke or bifurcated portion 42 on the end of the arm and by means of a pin 45 extending through the projection and yoke. As shown in FIG. 1, the spider and valve head are swingable upwardly to a position in the upper portion 15 of the valve housing and out of registry with the conduits 10 and 10'. Thus, a cleaning device may be projected through the conduits and through the valve housing without the valve head or spider interfering with the passage of the cleaning device.

The valve element may be raised to the position shown in FIG. 1 by means of a hand operated means 46 which includes a crank 47 having a worm gear 50 fixed thereto. The worm gear is rotatably mounted within a suitable housing 51 fixed to the outer surface of the valve housing 11 and meshes with a worm wheel 52 keyed to a shaft 55 rotatably mounted upon the valve housing 11 and extending through the upper portion 15 of the interior thereof. A conventional bearing seal assembly 55A with suitable packing rotatably receives the shaft 55 and is threadedly fixed by threads 55B to the housing 11. Fixed to the shaft 55 and inside of the housing 11 is a member 54 including a pair of arms 56, said member 54 forming a part of a toggle mechanism 57 also including an arm 60.

The arms 56 and 60 are pivoted to one another by means of a pin 61 fixed to the arms 56 and extending through an elongated slot 65 formed in the end 62 of the arm 60. The arm 60 is also pivoted at its end 66 to the arm 35 of the spider 20, this pivotal connection being accomplished by means of a pin 67 extending through the yoke shaped end 66 and through a ring 70 formed integrally with the arm 35 of the spider.

The arm 60 has an indentation 71 formed therein which receives a pin 72 fixed to and extending between the arms 56 whereby the toggle arrangement 57 is locked against further downward movement from the position shown in FIG. 2. In other words, the toggle arrangement is movable between the positions shown in FIG. 1 and FIG. 2 but not beyond the position shown in FIG. 2.

The purpose of the elongated slot 65 in the connection of the arms 56 and 60 is to relieve initial pressure on the mechanical activating means 46 when the valve is operated to move toward open position from the closed position of FIG. 2. If desired, other types of activating means may be used in place of the means 46.

It should also be mentioned that the spring mounting of the valve head upon the spider makes possible the adjustment of the valve head to accommodate objects which are between the valve head and valve seat when the valve is in closed position. It also makes possible the creation of relatively high uniform pressure of the valve head against the valve seat in order to prevent leakage.

It should be emphasized that the complete valve head, the spider and the toggle mechanism as well as the shaft 55 extending through the valve housing are all in the upper portion 15 of the interior 12 when the valve arrangement is in the open position illustrated in FIG. 1. Thus, a cleaning device extending through the conduits 10 and 10' and the interior 12 will not be interfered with in any manner.

From the above description, it will be obvious that the present invention provides an improved valve arrangement for use in liquid elimination systems. It will also be obvious that the present valve arrangement permits easy cleaning by conventional conduit cleaning devices. It should also be evident that the present invention incorporates means for insuring sealing even though great pressures are experienced and even though objects become lodge between the valve head and the valve seat.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claim are also desired to be protected.

The invention claimed is:

A valve arrangement for liquid eliminating systems comprising a pair of conduits having straight coaxial spaced end portions, a valve housing connecting said end portions, one of said conduits defining a valve seat at its opening into said valve housing, said housing having a hollow interior a portion of which is above and out of registry with said conduits, a frustoconically shaped valve head, a spider having four radially extending arms, two of which extend vertically and oppositely and two of which extend horizontally and oppositely, each of said head and spider having concentric coaxial openings therethrough, a connecting element slidably received within said openings and having limiting surfaces limiting said spider and head against movement away from one another, a spring received between each of the four arms of said spider and said valve head, said spider being pivotally mounted about a horizontal axis upon said housing for swinging said spider and valve head up into said portion to a first position wherein said spider and head are out of the path of said conduits, said spider being swingable downwardly to a second position wherein said valve head is seated in said valve seat, a resilient annular seal secured to said valve head and completely surrounding said valve head in the radial direction, said seal cooperating with said valve seat to provide a sealing relation even with objects therebetween, a toggle mechanism including a pair of elongated elements a first of which is pivoted at one end to said spider and a second of which is pivoted at one end to said valve housing in said portion, one of said elements having a slot therein extending longitudinally thereof, a pin secured to the other of said elements and slidably received in said slot and connecting said elements, said toggle mechanism locking said spider in said first position against pressure within said one conduit and being received in said portion when said spider is in said second position, none of the adjacent ones of said springs being on the same horizontal level, the spring associated with one of said vertically extending arms being between and above the springs associated with said horizontally extending arms when said spider is in said second position, and means for swinging said second element to move said spider between said positions.

References Cited by the Examiner

UNITED STATES PATENTS

| 1,561,544 | 11/25 | How | 251—280 XR |
| 1,836,343 | 12/31 | Smith | 251—357 XR |
| 1,917,000 | 7/33 | Tyden | 251—357 XR |
| 2,312,290 | 2/43 | Smith | 137—527.4 |
| 2,688,341 | 9/54 | McBain | 251—249.5 XR |
| 3,040,772 | 6/62 | Todd | 251—297 XR |

FOREIGN PATENTS

| 802,855 | 2/51 | Germany. |

ISADOR WEIL, *Primary Examiner.*

MARTIN P. SCHWADRON, WILLIAM F. O'DEA, *Examiners.*